Oct. 29, 1963 ÅKE E. MURVALL 3,108,762
SPINNING REELS

Filed April 28, 1961 2 Sheets-Sheet 1

INVENTOR.
ÅKE EUGEN MURVALL
BY
*J Bradley Cohn*
ATTORNEY

United States Patent Office 3,108,762
Patented Oct. 29, 1963

3,108,762
SPINNING REELS
Åke Eugen Murvall, Marieberg, Svangsta, Sweden, assignor to Aktiebolaget Urfabriken, Svangsta, Sweden, a corporation of Sweden
Filed Apr. 28, 1961, Ser. No. 106,278
Claims priority, application Sweden May 2, 1960
2 Claims. (Cl. 242—84.2)

This invention relates to an improvement in spinning reels comprising a cup shaped line guide rotatable by means of a crank and having its borders extending downwards over a line spool fixedly mounted in the reel, a pick-up pin mounted on a slide radially displaceable within the line guide for projection radially outward from the line guide and for retraction within the outer periphery of the line guide, an operating member operable from the outside of the reel for the retraction of the pick-up pin within the line guide, and means to automatically displace the pick-up pin to the projected position at the beginning of the rotation of the line guide.

In most reels of this type the pick-up pin and its supporting slide are urged by a spring inwards to the retracted position while the displacement to the projection position is obtained by a cam member cooperating with the slide at the rotation of the cup shaped line guide. Further, in such known reels, the release of the pick-up pin slide for retracting motion at the operation of the operating member is obtained by an axial displacement either of the line guide relative to the reel or of the pick-up pin slide relative to the line guide.

A purpose of the invention is to obtain a spinning reel of the type indicated in which neither the line guide cup nor the pick-up pin supporting slide effect any axial displacement when the operating member is operated for the retraction of the pick-up pin.

A further purpose of this invention is to obtain a spinning reel, in which the pick-up pin is positively retracted at the operation of the operating member and not, as usual released for retraction by a spring.

For these purposes the pick-up pin supporting slide has a wedge shaped portion which in the position, in which the pick-up pin projects outside the line guide cup and towards which the slide is urged by a spring, extends within the path of motion of push member displaceable axially within the hollow shaft of the line guide cup under the action of the operating member for the displacement of the slide towards the retracted position of the pick-up pin by cooperation of said push member with said wedge shaped portion of the slide, two latches pivotally mounted in the line guide cup and spring biased towards their engagement with projections on the pick-up pin slide, and a projection on a fixed portion of the reel extending eccentrically within the path of motion of the latches at the rotation of the line guide cup.

Figure 1:
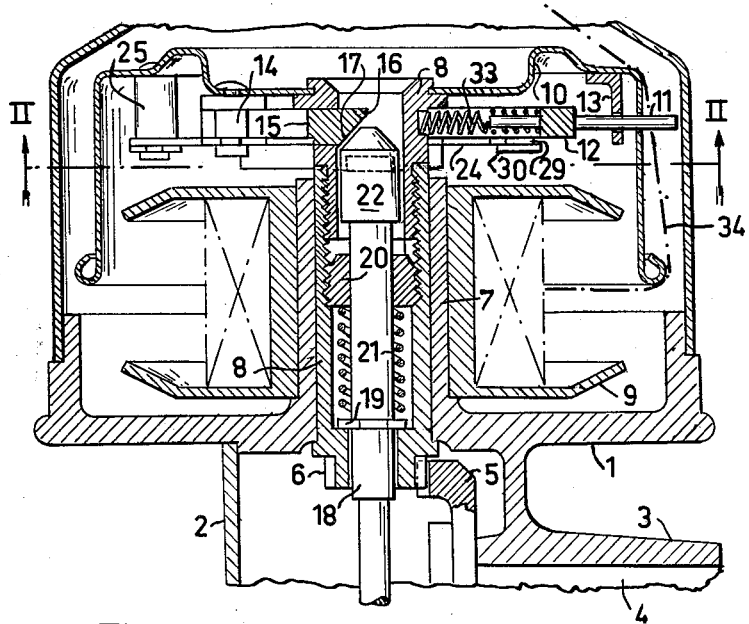
Figure 2:
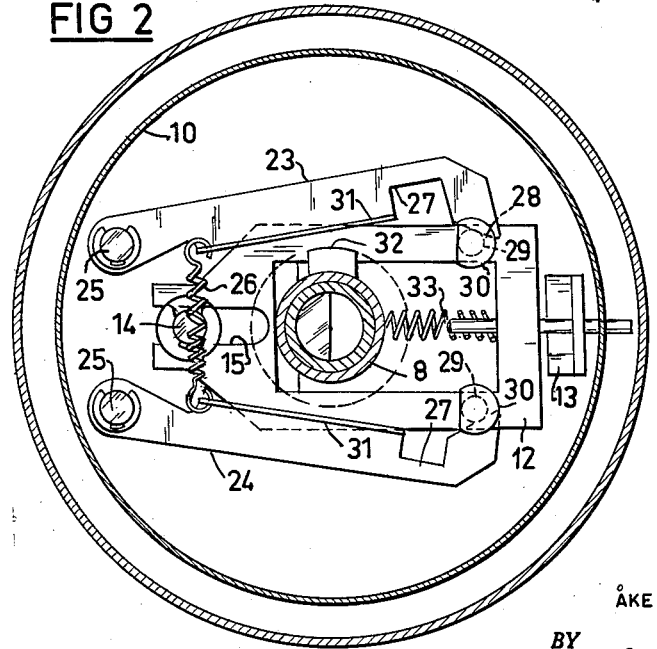
Figure 3:
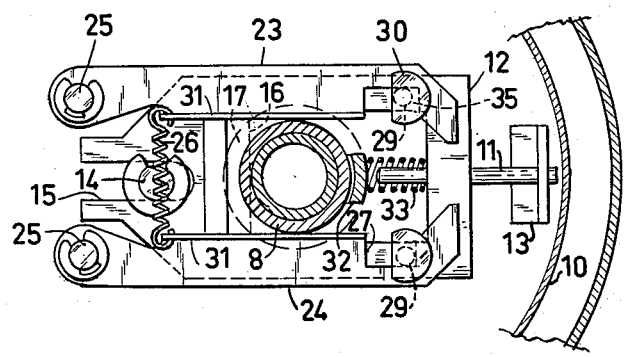
Figure 4:
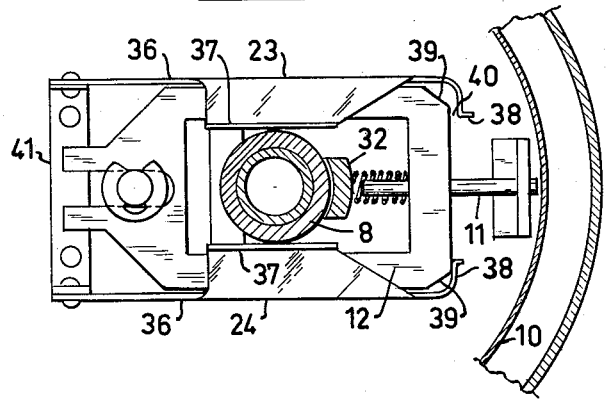

The purposes and features of the present invention will become more clear from the following description of two embodiments of the invention diagrammatically shown in the enclosed drawings, in which FIG. 1 is an axial section through the parts of a spinning reel, with which the invention is concerned. FIG. 2 is a transverse section along line II—II in FIG. 1. FIG. 3 shows in the same manner as FIG. 2 the parts concerned in another position. FIG. 4 in a manner similar to FIG. 3 is a second embodiment of the invention.

The spinning reel shown in FIG. 1 comprises a housing 1 having a gear casing 2 and a hub 3 for a crank shaft 4 operated by a crank not shown at the outside of the housing and supporting a gear wheel 5 within the gear housing, said gear wheel engaging a second gear 6 mounted on the lower end of a hollow shaft 8 rotatable within a hub 7 in the housing 1. The hub 7 serves as a centering sleeve for a line spool 9, which is secured against rotation by any appropriate means not shown. On the upper end of the hollow shaft 8 projecting from the hub 7 is mounted a cup shaped line guide member 10, the border portions of which extend downwards over and outside the upper portion of the line spool 9 as usual in reels of the type in question. A pick-up pin 11 extending radially of the line guide has its inner end mounted on a frame shaped slide 12 and can extend to the outside of the line guide cup through a hole in the border portion thereof. As can be seen most clearly from FIG. 2, the frame shaped slide 12 surrounds the line guide shaft 8 and is radially displaceably guided in the line guide cup by means of the pick-up pin, which is further slidably guided within a little bracket 13 mounted in the line guide, and between a ledge and a washer or clip on a pin 14 mounted in the line guide cup 10. Said pin 14 is positioned on the side of the shaft 8 opposite the pick-up pin, and extends through a radial slot 15 in the slide 12. The slide has an edge 16 running at right angles to the direction of the displacements of the slide and to the axis of rotation of the line guide 10. Below the edge 16 the slide has an inclined surface 17 defining a wedge shaped portion.

A rod 18 is axially displaceably guided within the hollow shaft 8 and extends downwards through the gear casing 2, the lowermost end of the rod cooperating with an operating member, operable from the outside of the reel of known device, and not illustrated for the axial displacement of the rod upward according to FIG. 1. The rod 18 is actioned downward by a spring 21 tensioned between a washer 19 on the rod 18 and a ring 20 screwed into the hollow shaft 8. At its upper end, the rod 18 has an upward tapering head 22, which in the lower rest position illustrated of the rod is positioned immediately below the inclined surface 17. Two catches or latches 23 and 24 are pivotally mounted on pins 25 placed essentially symmetrically on both sides of a diametral line passing through the axis of rotation of the line guide cup and through the pick-up pin 11. The latches are urged towards each other by a spring 26 tensioned between them and shown in FIGS. 2 and 3. The latches have at their free ends recesses 27 turned towards each other and at their outmost ends inclined guide surfaces 28 converging towards each other. For cooperation with the latch recesses 27 and the guide surfaces 28 there are two pins 29 mounted in the slide, said pins having end flanges 30 extending over the latches to prevent the latter from axial displacements. The latches 23 and 24 are along their edges turned towards the hollow shaft 8 provided with flaps 31 extending axially (downwards according to FIG. 1) and provided for cooperation with a projection 32 extending between them from the hub 7. A spring 33 tensioned between the shaft 8 and the slide 12 urges the latter in the direction of its displacement towards the position, in which the pick-up pin projects outside the border portion of the line guide 10 and into the path of motion of the line 34 running from the spool 9 over the border of the line guide 10.

Further details of the structure can be understood from the following description of the working of the device described above.

Under normal use of the reel, after the winding up of the line on the spool 9 and at the beginning of the throwing motion, the parts are in the positions illustrated in FIGS. 1 and 2. When the line 34 shall be released at the end of the throwing motion, the actuating rod 18 is displaced upwards (as seen in FIG. 1) by means of the operating member not illustrated, which cooperates with the lowermost end of the rod. The head 22 of the rod cooperates with the inclined surface 17 and displaces the slide 12 from the projecting position illustrated in FIG. 2 to the retracted position illustrated in FIG. 3, in which the pick-up pin 11 is retracted from the path of motion of the line 34. At the displacement of the slide the pins 29 are placed facing the recesses 27, so that the latches 23 and 24 are drawn toward each other by the spring 26 to their locking position, in which the recesses engage the pins 29, as shown in FIG. 3 and thereby lock the slide 12 in the retracted position. If the projection 32 on the hub 7, as shown in FIG. 2, is situated between the shaft 8 and the flap 31 on one of the catches 23, 24, this latch is of course prevented from engaging the corresponding pin 29, but the other catch is free to lock the slide in the retracted position.

The slide 12 with the pick-up pin 11 remains in this retracted position until the winding in of the line is commenced by turning the shaft 4 with the crank whereby also the hollow shaft 8 with the line guide 10 and the entire mechanism illustrated in FIGS. 2 and 3 is rotated relative to the hub 7 and the projection 32 thereon. Thus the latches 23 and 24 are alternately swung outwards by the projection 32 in cooperation with the flaps 31. If the outer edges of the recesses were in such positions, that they could simultaneously rest against the pins 29, the latches would be returned to their engaging position with the pins 29 by the spring 26 each time they had been moved outwards, so that the slide never would be released for its return to the projecting position under the action of the spring 33. Therefore, as clearly shown in FIG. 3, the recesses 27 and the pins 29 are placed in such relative positions that the recess 27 of one catch 23 has its outer edge at some space 35 from the corresponding pin 29, when the other pin 29 rests against the outer edge of the recess 27 in the other catch 24.

With regard to the possible relative positions of the projection 32 and the catches 23 and 24 after the displacement of the slide 12 from the projecting position according to FIG. 2 to the retracted position according to FIG. 3 at the beginning of the rotation of the line guide 10 and the mechanism mounted therein, four different cases can occur.

If the projection 32, as shown in FIG. 3, is situated between the latches 23 and 24 on the side of the shaft 8 facing the pick-up pin, and provided that the line guide cap is rotated in the clockwise direction, which corresponds to a counter-clockwise direction of rotation of the projection 32 relative to the line guide 10, the catch 23 will first be actioned outward and thereafter be returned to the initial position illustrated in FIG. 3, while the slide 12 is retained by the other catch 24. Thereafter catch 24 will be swung outward and thereby the slide 12 is released for displacement by its spring 33 a distance corresponding to the space 35, which displacement is sufficient to prevent the catch 24 from returning into engagement with the corresponding pin 29. Thereafter catch 23 is again swung outwards and the slide 12 is thereby finally released for displacement to the projecting position. Under the circumstances considered, the line guide 10 and the mechanism have been rotated one and a quarter of a revolution before the pick-up pin is pushed out.

If the projection 32 at the retraction of the slide 12 is placed between the shaft 8 and the catch 23, the latter is prevented from engaging its pin 29. When the projection 32 leaves the catch 23, the latter is returned to the engaging position shown in FIG. 3. Thereafter first the catch 24 and then the latch 23 must be swung out for the slide 12 to be entirely released for displacement to the projecting position. The line guide 10 and the mechanism therein then perform one whole revolution before the pick-up pin is pushed out.

If the projection 32 at retraction of the pick-up pin 11 is situated between the catches 23 and 24 on the side of the shaft 8 opposed to the pick-up pin 11, first the latch 24 and then the latch 23 must be swung outwards for the releasement of the slide. The line guide 10 and the mechanism therein have then performed three quarters of a revolution before the pick-up pin is pushed out.

If, finally, the projection 32 is situated between the shaft 8 and the catch 24, when the pin has been retracted, the latch 24 does not return into engagement with the pin 29, because the other latch 23 holds the slide in the slightly displaced position. Therefore, as soon as the projection 32 has operated the other latch 23, the slide is released for displacement to the projecting position. The line guide 10 and its mechanism have then performed half a revolution before the pick-up pin is pushed out.

The latches can also have their ends bent upward (as seen in FIG. 1) and adapted for engagement with the forward end of the slide, i.e. the end face from which the pin 11 protrudes. Thereby both pins 29 and recesses 27 are unnecessary.

The inclined surfaces 28 on the ends of the latches 23 and 24 have the purpose after the release of the slide and by its radial motion to the projecting position to swing the latches further outward and away from the imaginary path of motion of the projection 32 so as to avoid unnecessary wear and unnecessary sounds, which otherwise would be produced at each half revolution by impact of the catches against the projection 32.

Even other embodiments can be imagined within the scope of the invention. An example of such an embodiment is shown in FIG. 4 in which the catches 23 and 24 are formed of blade springs 36 with inwardly bent flaps 37, which similarly to the previously described flaps 31 according to FIGS. 1 to 3 cooperate with the fixed projection 32 for the outward swinging motion of the catches. These blade springs 36 are preferably mounted on a bracket 41 secured to the inside of the line guide 10 and extend along both sides of the slide 12. In the retracted position of the slide illustrated in FIG. 4 the catches 23 and 24 engage with their bent in ends 38 the forward end face of the slide. The corners of the slide 12 cooperating with the ends 38 of the latches 23, 24 are chamfered to form inclined surfaces 39, which at the swinging outwards of the catches by the projection 32 and at the consequent displacement of the slide 12 impart a little additional swinging motion outwards to the catches so as to bring them positively out of reach of the projection 32. In order to bring the latches 23 and 24 into action at different only slightly spaced positions of the slide, the end 38 of the one catch 23 is at a little distance 40 from the forward end of the slide when the end 38 of the other catch 24 retains the slide 12 in the retracted position. This space 40 has the same purpose as the space 35 in the embodiment shown in FIG. 3.

Further forms and arrangements, especially of the cooperating parts of the slide and latches, can be used within the scope of the invention.

What I claim is:

1. In a spinning reel, a cup shaped line guide rotatably mounted about a line spool, a pick-up pin slidably mounted in said line guide and displaceable radially for projection outside the line guide, an actuating member operable to retract the pick-up pin within the line guide means to bias the pick-up pin to the projected position, two latches movably mounted in the line guide to latchingly engage said pick-up pin in its retracted position, means biasing said latches toward engaging position, a stationary lug positioned to successively contact and move said latches out of latching position during rotation of the line guide, each of said latches latching said pin at a different retracted position thereof.

2. In a spinning reel, a rotatable line guide, a device slidably mounted in said guide for to and fro movement along a defined path, means urging said device in one direction along said path, a pair of latches mounted in said guide, means biasing said latches to latchingly retain said device along said path against said urging means, the first of said latches latching said device at a first position and the second of said latches latching said device at a second successive position along said path, and mechanism to successively unlatch said latches whereby said device is released to be moved along said path by said urging means.

References Cited in the file of this patent

UNITED STATES PATENTS

| | | |
|---|---|---|
| 2,630,979 | Uerling | Mar. 10, 1953 |
| 2,903,201 | Sarah | Sept. 8, 1959 |
| 2,915,258 | Hull | Dec. 1, 1959 |
| 2,929,579 | Hull | Mar. 22, 1960 |

FOREIGN PATENTS

| | | |
|---|---|---|
| 610,752 | Canada | Dec. 20, 1960 |

OTHER REFERENCES

German application T11406, printed Aug. 9, 1956 (K145h31).